United States Patent
Kim et al.

(10) Patent No.: US 8,523,230 B2
(45) Date of Patent: Sep. 3, 2013

(54) APPARATUS FOR DISPLACING ANCHOR PRE-TENSIONER FOR SEAT BELT

(75) Inventors: Young Rok Kim, Hwaseong-si (KR); Choong Sik Shin, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/540,344

(22) Filed: Jul. 2, 2012

(65) Prior Publication Data

US 2013/0147175 A1    Jun. 13, 2013

(30) Foreign Application Priority Data

Dec. 9, 2011    (KR) .................. 10-2011-0131828

(51) Int. Cl.
 *B60R 22/195* (2006.01)
 *B60R 22/20* (2006.01)
 *B60R 22/24* (2006.01)

(52) U.S. Cl.
 USPC ..................................... 280/806; 280/801.2

(58) Field of Classification Search
 USPC ........... 280/806, 801.2, 804, 801.1; 180/274; 297/473, 480, 482
 See application file for complete search history.

(56) References Cited

U.S. PATENT DOCUMENTS

| | | | |
|---|---|---|---|
| 7,147,251 B2 * | 12/2006 | Bell et al. ..................... | 280/806 |
| 8,302,994 B2 * | 11/2012 | Ko .............................. | 280/801.1 |
| 8,376,405 B2 * | 2/2013 | Kim ............................. | 280/806 |
| 2007/0029774 A1 * | 2/2007 | Kuroki ......................... | 280/806 |
| 2012/0139222 A1 * | 6/2012 | Lee et al. .................... | 280/801.2 |

FOREIGN PATENT DOCUMENTS

| KR | 10-2004-0106132 A | 12/2004 |
|---|---|---|
| KR | 10-2011-0101409 A | 9/2011 |

* cited by examiner

*Primary Examiner* — Joseph Rocca
*Assistant Examiner* — Keith Frisby
(74) *Attorney, Agent, or Firm* — Morgan, Lewis & Bockius LLP

(57) ABSTRACT

An apparatus for displacing an anchor pre-tensioner for a seat belt may include the anchor pre-tensioner which is installed on a lower portion of a center pillar of a vehicle body, and to which a wire is coupled at an angle with the wire exposed above the vehicle body; and a trim guide which is installed on the vehicle body, and which has a guide hole in the middle thereof so as to allow the wire to be fitted into and guided in the guide hole, and a stopper formed at one end of the guide hole so as to allow the wire to be caught in the stopper when the wire is tilted in a backward direction of the vehicle body.

11 Claims, 3 Drawing Sheets

APPARATUS FOR DISPLACING ANCHOR PRE-TENSIONER FOR SEAT BELT

CROSS-REFERENCE TO RELATED APPLICATIONS

The present application claims priority to Korean Patent Application No. 10-2011-0131828 filed on Dec. 9, 2011, the entire contents of which is incorporated herein for purposes by this reference.

BACKGROUND OF THE INVENTION

1. Field of the Invention

The present invention relates, in general, to an apparatus for displacing an anchor pre-tensioner for a seat belt, capable of preventing a rear seat passenger from stumbling over the anchor pre-tensioner when the rear seat passenger gets in or out of a two-door (2DR) vehicle.

2. Description of Related Art

In general, seat belts are installed in a vehicle so as to pull the body of a passenger in the event of a vehicle collision or rapid braking to prevent the passenger from being thrown out of the vehicle or impacting against a vehicle body and receiving heavy injuries.

A retractor and an anchor pre-tensioner are installed on the lower end of a center pillar for a driver's seat and a front passenger's seat, and a fixture for guiding webbing is installed on an upper end of the center pillar. The webbing is retractably wound into the retractor. One end of the webbing is connected to the anchor pre-tensioner via the fixture. A buckle is installed on a lower portion of the seat located on the opposite side of the retractor so that a tongue of the seat belt can be fastened thereto.

Here, the anchor pre-tensioner is anchored to a vehicle body of the lower end of the center pillar, and a wire 1 of an upper end of the anchor pre-tensioner protrudes toward the interior of the vehicle body, as shown in FIG. 1.

However, when the anchor pre-tensioner is applied to a 2DR vehicle such as a Coupe vehicle, a distance D between the center pillar and the wire exposed to the outside when a door is open is set to be excessive. As such, a rear seat passenger stumbles over the wire when getting in or out of the vehicle, and thus is exposed to the dangers of harm or a safety accident.

To solve this problem, the fixed position of the anchor pre-tensioner may be moved rearward. In this case, the anchor pre-tensioner is vulnerable to a submergence phenomenon wherein a lower body of the passenger is pulled down to the bottom in the event of a rear-end collision, creating the problem of exposing the passenger to the dangers of more severe harm.

In addition, as another solution, the wire may be fixed so as to be directed rearward. In this case, the wire is forcibly displaced toward the front in the event of a rear-end collision, and thus the slack of the webbing takes place, resulting in the fatal problem that the webbing cannot stably restrain the passenger.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for displacing an anchor pre-tensioner for a seat belt, capable of preventing a rear seat passenger from stumbling over the anchor pre-tensioner when the rear seat passenger gets in or out of a 2DR vehicle.

In an aspect of the present invention, an apparatus for displacing an anchor pre-tensioner for a seat belt, may include the anchor pre-tensioner which is installed on a lower portion of a center pillar of a vehicle body, and to which a wire is coupled at an angle with the wire exposed above the vehicle body, and a trim guide which is installed on the vehicle body, and which may have a guide hole in the middle thereof so as to allow the wire to be fitted into and guided in the guide hole, and a stopper formed at one end of the guide hole so as to allow the wire to be caught in the stopper when the wire is tilted in a backward direction of the vehicle body.

The stopper is formed on a side of the center pillar.

A shape of the stopper is a recessed shape.

The trim guide may include a guide part protruding from an inner surface of the guide hole which is adjacent to the stopper so as to allow the wire tilted in a backward direction to be guided toward the stopper.

The guide part is inclined with a first slope toward the stopper from the inner surface.

The trim guide may include a ridge protruding from an inner side of the stopper, so that a shape of the stopper is a recessed shape.

The ridge is inclined with a second slope at a frontal end thereof so as to allow the wire to be smoothly guided into the stopper when the wire moves in the backward direction.

The guide part is inclined with a first slope toward the stopper from the inner surface, wherein the ridge is inclined with a second slope at a frontal end thereof, and wherein the first slope is inclined toward the second slope.

The stopper in which the wire is caught is higher than surroundings of the trim guide.

The stopper is installed adjacent to a portion where the wire is pivotally coupled.

The wire is pivotally coupled to the pre-tensioner and is tilted about a pivotal axis thereof.

In the apparatus for displacing an anchor pre-tensioner for a seat belt according to the embodiment of the present invention, when a rear-seat passenger gets on or off a 2DR vehicle, the wire is temporarily fixed in the stopper. Thereby, a distance between the wire and the center pillar is greatly reduced, and thus the passenger is prevented from stumbling over the wire. As a result, the dangers of harm to the passenger can be reduced, and the passenger can get in or out of the 2DR vehicle in an easy and simple manner.

Moreover, the wire can be released from the stopper just by pulling the seat belt to buckle up the seat belt in a state where the wire is caught in the stopper, so that the passenger reliably buckles up the seat belt, and is prevented from the dangers of harm caused by a collision.

Further, when the rear-seat passenger gets in or out, the temporary anchoring of the wire is made possible. Thereby, the pre-tensioner and the wire can be installed without an influence on collision performance, and thus merchantability of the vehicle and stability and reliability of the seat belt can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
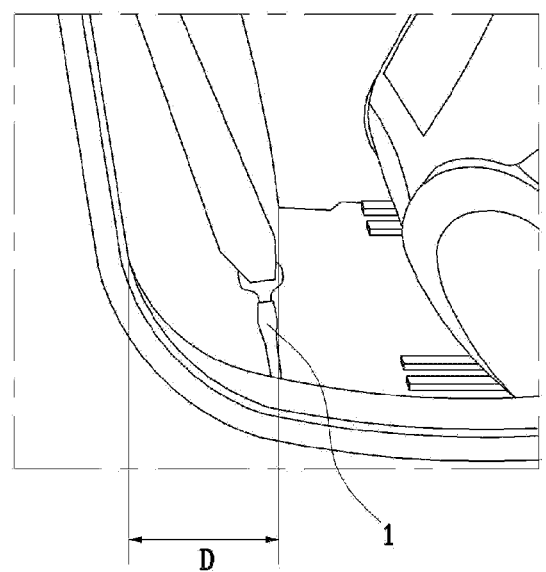
FIG. 1 shows a distance between a conventional pre-tensioner and a center pillar.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in greater detail to an exemplary embodiment of the invention with reference to the accompanying drawings.

Figure 2:
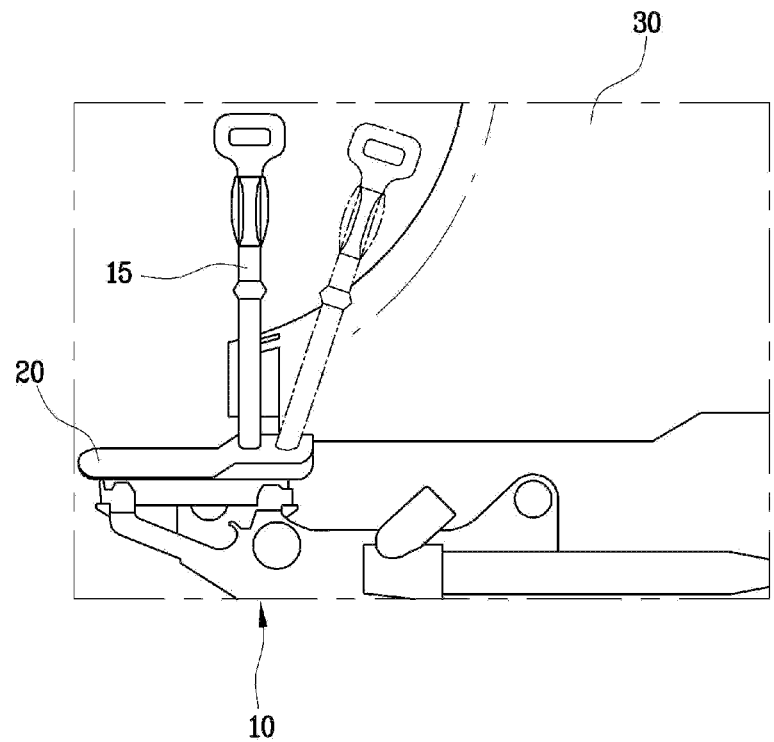
FIG. 2 is a view that explains an operational relationship where a wire is tilted in an apparatus for displacing an anchor pre-tensioner according to an exemplary embodiment of the present invention.
Figure 3:
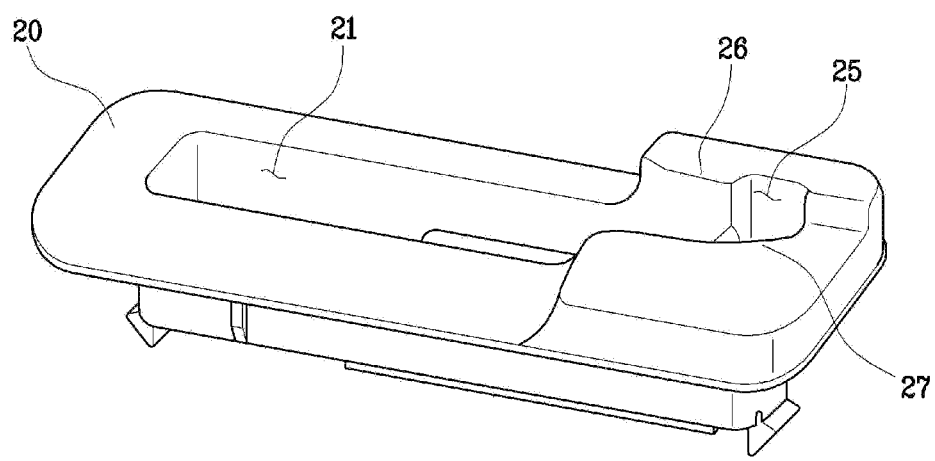
FIG. 3 shows a shape of a trim guide according to the exemplary embodiment of the present invention.
Figure 4:
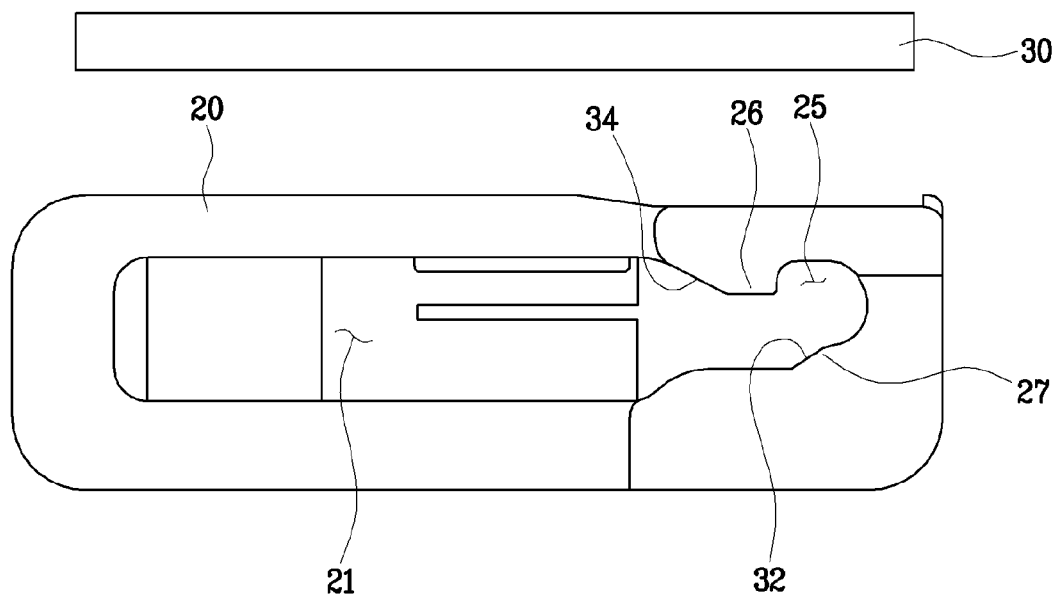
FIG. 4 is a top view that explains a structure of the trim guide according to the exemplary embodiment of the present invention.
Figure 5:
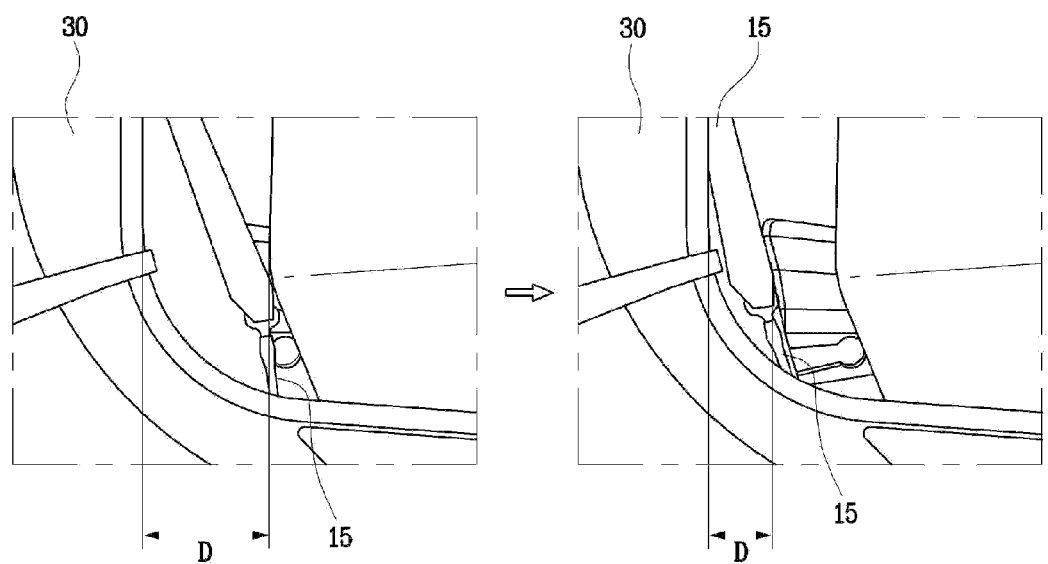
FIG. 5 shows a distance between an anchor pre-tensioner and a center pillar before and after the anchor pre-tensioner displacing apparatus according to the exemplary embodiment of the present invention is applied.

As shown in FIGS. 2 to 5, an apparatus for displacing an anchor pre-tensioner for a seat belt according to an exemplary embodiment of the present invention includes: the anchor pre-tensioner 10 which is installed on a lower portion of a center pillar 30 of a vehicle body, and to which a wire 15 is coupled at an angle with the wire exposed above the vehicle body, and a trim guide 20 which is installed on the vehicle body, and which has a guide hole 21 in the middle thereof so as to allow the wire 15 to be fitted into and guided in the guide hole 21, and a stopper 25 at one end of the guide hole 21 so as to allow the wire 15 to be caught in the stopper 25 when the wire 15 is angled towards the rear.

That is, the wire 15 of the anchor pre-tensioner 10 visibly installed on the lower portion of the center pillar 30 is configured to be caught in the stopper 25 of the trim guide 20, so that the distance D between the wire 15 exposed to a door and the center pillar 30 can be reduced, and thus the amount of the wire 15 exposed to the door can be reduced. Accordingly, when a rear-seat passenger gets in or out of a two-door (2DR) vehicle, such as a Coupe vehicle, that has doors mounted in the front, the passenger is prevented from stumbling over the wire 15, so that the dangers of harm taking place when the passenger gets in or out of the 2DR vehicle can be eliminated.

In an exemplary embodiment of the present invention, the stopper 25 may be formed on the side of the center pillar 30. That is, when the passenger gets in or out of the 2DR vehicle, the wire 15 is caught in the stopper 25 installed on the side of the center pillar 30. However, when a front-seat passenger pulls the seat belt (or webbing) to buckle up the seat belt, the wire 15 connected with the belt is pulled in a forward direction, and thus comes out of the stopper 25.

Thus, when the passenger gets in or out of the 2DR vehicle, the wire 15 is fixed in the stopper 25 at the rear side, thereby preventing the dangers of harm of the passenger. When the belt is buckled up, the wire 15 is tilted and fixed at a front position, so that the belt can be reliably buckled up.

In an exemplary embodiment of the present invention, the shape of the stopper 25 may be a recessed shape. That is, the stopper 25 is recessed in one end of the guide hole 21, so that the wire 15 can be tilted in a backward direction, and then be fixed in the stopper 25.

In an exemplary embodiment of the present invention, a ridge 26 protrudes from one side of the stopper 25, so that the shape of the stopper 25 can be a recessed shape. That is, when the wire 15 is tilted in a backward direction, the wire 15 is displaced in such a manner that the wire 15 runs over the ridge 26 in contact with the ridge 26, so that the wire 15 can be pushed into and fixed in the stopper 25 abutting on the ridge 26.

In an exemplary embodiment of the present invention, a guide part 27 protrudes from an inner surface of the guide hole 21 which is adjacent to the stopper 25, so that the wire 15 tilted in a backward direction can be guided toward the stopper 25.

That is, when the wire 15 is tilted in a backward direction, the wire 15 moves along the guide hole 21 and comes into contact with the guide part 27. Then, when the wire 15 is displaced in the backward direction with a stronger force, the wire 15 is guided along a slope 32 of the guide part 27 that is inclined toward the stopper 25, so that the wire 15 can be caught in the stopper 25.

In an exemplary embodiment of the present invention, a frontal end of the ridge 26 is formed to have a slope 34 that is inclined toward the slope 32, thereby allowing the wire 15 to be smoothly guided when the wire 15 moves in a backward direction.

That is, the wire 15 may be caught on the ridge 26 while moving along the guide hole 21 in a backward direction. As such, the frontal end of the ridge 26 is formed so as to be inclined, so that the wire 15 can be guided so as to be more smoothly displaced in the backward direction.

In an exemplary embodiment of the present invention, the stopper 25 in which the wire 15 is caught may be formed so as to be higher than the surroundings of the trim guide 20.

That is, the height of the stopper 25 is formed so as to be high. Thereby, a section where the wire 15 is caught in the stopper 25 is further lengthened, so that the wire 15 can be more stably caught in the stopper 25.

In an exemplary embodiment of the present invention, the stopper 25 may be installed adjacent to the portion where the wire 15 is coupled at an angle. That is, the wire 15 is pivotally coupled to the pre-tensioner 10 and is tilted about the pivotal axis. The stopper 25 is placed adjacent to the pivotal axis. Thereby, the wire 15 can be easily caught in the stopper 25 with a weak amount of force owing to the lever principle.

The operation and effects of the present invention will be described with reference to FIGS. 2 to 5.

When a passenger gets in or out of a 2DR vehicle, the passenger pushes or pulls the wire 15 connected to a belt using his/her own hand or foot, so that the wire 15 is tilted in a backward direction and is caught in the stopper 25.

Thus, a distance D between the wire 15 exposed to the outside when a door is open and the center pillar 30 is greatly reduced. As a result, the passenger is prevented from stumbling over the wire 15 when getting in or out of the 2DR vehicle, so that the dangers of harm to the passenger can be reduced, and the passenger can get in or out of the 2DR vehicle in an easy, simple manner.

Meanwhile, when a front seat passenger pulls the seat belt in order to buckle up the seat belt, the wire 15 is separated from the stopper 25 formed on the side of the center pillar 30, moves in a forward direction, and is located in a tilted state.

Thus, the wire 15 can be released from the stopper 25 just by pulling the belt without requiring the separate operation by the passenger of releasing the wire 15 from the stopper 25, so that the passenger can buckle up the seat belt, and is prevented from the dangers of harm caused by a collision.

For convenience in explanation and accurate definition in the appended claims, the terms "upper", "lower", "inner", "outer", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for displacing an anchor pre-tensioner for a seat belt, comprising:
    the anchor pre-tensioner which is installed on a lower portion of a center pillar of a vehicle body, and to which a wire is coupled at an angle with the wire exposed above the vehicle body; and
    a trim guide which is installed on the vehicle body, and which has a guide hole in the middle thereof so as to allow the wire to be fitted into and guided in the guide hole, and a stopper formed at one end of the guide hole so as to allow the wire to be caught in the stopper when the wire is tilted in a backward direction of the vehicle body.

2. The apparatus according to claim 1, wherein the stopper is formed on a side of the center pillar.

3. The apparatus according to claim 1, wherein a shape of the stopper is a recessed shape.

4. The apparatus according to claim 1, wherein the trim guide includes a guide part protruding from an inner surface of the guide hole which is adjacent to the stopper so as to allow the wire tilted in a backward direction to be guided toward the stopper.

5. The apparatus according to claim 4, wherein the guide part is inclined with a first slope toward the stopper from the inner surface.

6. The apparatus according to claim 5, wherein the ridge is inclined with a second slope at a frontal end thereof so as to allow the wire to be smoothly guided into the stopper when the wire moves in the backward direction.

7. The apparatus according to claim 1, wherein the trim guide includes a ridge protruding from an inner side of the stopper, so that a shape of the stopper is a recessed shape.

8. The apparatus according to claim 1,
    wherein the guide part is inclined with a first slope toward the stopper from the inner surface;
    wherein the ridge is inclined with a second slope at a frontal end thereof; and
    wherein the first slope is inclined toward the second slope.

9. The apparatus according to claim 1, wherein the stopper in which the wire is caught is higher than surroundings of the trim guide.

10. The apparatus according to claim 1, wherein the stopper is installed adjacent to a portion where the wire is pivotally coupled.

11. The apparatus according to claim 10, wherein the wire is pivotally coupled to the pre-tensioner and is tilted about a pivotal axis thereof.

* * * * *